(12) United States Patent
Fujita (10) Patent No.: US 11,993,906 B2
(45) Date of Patent: May 28, 2024

(54) FLOATING-OIL RECOVERY DEVICE (71) Applicant: NATIONAL INSTITUTE OF MARITIME, PORT AND AVIATION TECHNOLOGY, Tokyo (JP)

(72) Inventor: Isamu Fujita, Kanagawa (JP)

(73) Assignee: National Institute of Maritime, Port and Aviation Technology, Tokyo (JP)

( * ) Notice: Subject to any disclaimer, the term of this patent is extended or adjusted under 35 U.S.C. 154(b) by 0 days.

(21) Appl. No.: 17/703,980

(22) Filed: Mar. 24, 2022

(65) Prior Publication Data

US 2022/0213659 A1 Jul. 7, 2022

Related U.S. Application Data

(63) Continuation of application No. PCT/JP2020/028683, filed on Jul. 27, 2020.

(30) Foreign Application Priority Data

Apr. 17, 2020 (JP) .................................. 2020-074276

(51) Int. Cl.
*E02B 15/04* (2006.01)
*B01D 17/02* (2006.01)
(Continued)

(52) U.S. Cl.
CPC ........ *E02B 15/045* (2013.01); *B01D 17/0211* (2013.01); *B01F 23/23121* (2022.01);
(Continued)

(58) Field of Classification Search
CPC ...... E02B 15/045; E02B 15/046; E02B 15/08; E02B 15/108; E02B 15/041; E02B 15/10;
(Continued)

(56) References Cited

U.S. PATENT DOCUMENTS 3,659,713 A 5/1972 Mueller
5,108,600 A * 4/1992 Rees ..................... E02B 15/108
210/519

(Continued)

FOREIGN PATENT DOCUMENTS

CN 107524127 A 12/2017
GB 1552489 A 9/1979

(Continued)

OTHER PUBLICATIONS

Translation of JP2001129588A_OKAMOTO_NPL.pdf (Year: 2001).*
(Continued)

*Primary Examiner* — Ekandra S. Miller-Cruz
(74) *Attorney, Agent, or Firm* — Apex Juris, pllc; Hilde M. L. Coeckx (57) ABSTRACT

A floating-oil recovery device includes: a bubble-curtain generation mechanism configured to discharge air into water to generate a bubble curtain in the water so as to increase a thickness of a film of floating oil while regulating spread of the floating oil; and an ejector configured to recover an oil-water mixed fluid having the floating oil and the water mixed with each other by jetting high-velocity water toward the film of floating oil enclosed with the bubble curtain to destroy the film of floating oil.

7 Claims, 7 Drawing Sheets

(51) Int. Cl.
  *B01F 23/231* (2022.01)
  *B01F 101/00* (2022.01)
  *B63B 35/32* (2006.01)
  *C02F 1/24* (2023.01)
  *C02F 1/68* (2023.01)
  *C02F 101/32* (2006.01)
  *E02B 15/08* (2006.01)
  *E02B 15/10* (2006.01)

(52) U.S. Cl.
  CPC ............... *B63B 35/32* (2013.01); *C02F 1/24* (2013.01); *C02F 1/682* (2013.01); *E02B 15/046* (2013.01); *E02B 15/08* (2013.01); *E02B 15/108* (2013.01); *B01F 2101/305* (2022.01); *C02F 2101/32* (2013.01); *C02F 2201/001* (2013.01)

(58) Field of Classification Search
  CPC ........... B01D 17/0211; B01F 23/23121; B01F 2101/305; B63B 35/32; C02F 1/24; C02F 1/682; C02F 2101/32; C02F 2201/001; C02F 2103/007; C02F 2103/08; C02F 2103/12; C02F 1/40; Y02A 20/204
  USPC ...................................................... 210/242.3
  See application file for complete search history.

(56) References Cited

U.S. PATENT DOCUMENTS

| | | | |
|---|---|---|---|
| 5,527,461 A | 6/1996 | Hill | |
| 6,517,715 B1 * | 2/2003 | Batten | B01D 17/0208 |
| | | | 210/538 |
| 8,397,921 B2 * | 3/2013 | Utsunomiya | B01D 21/04 |
| | | | 210/523 |
| 2012/0228216 A1 * | 9/2012 | Gavrieli | C02F 3/103 |
| | | | 210/615 |
| 2019/0145074 A1 | 5/2019 | Sorstrom et al. | |

FOREIGN PATENT DOCUMENTS

| | | | | |
|---|---|---|---|---|
| JP | 51-096143 A | | 8/1976 | |
| JP | 54-116394 U1 | | 8/1979 | |
| JP | 59-230887 A | | 12/1984 | |
| JP | 4-064614 A | | 2/1992 | |
| JP | 4-266588 A | | 9/1992 | |
| JP | 10-235230 A | | 9/1998 | |
| JP | 11-152080 A | | 6/1999 | |
| JP | 2000-008358 A | | 1/2000 | |
| JP | 2000-072084 A | | 3/2000 | |
| JP | 2001129588 A | * | 5/2001 | ............... C02F 3/20 |
| JP | 2005-013880 A | | 1/2005 | |
| JP | 2005089978 A | * | 4/2005 | ........... Y02A 20/204 |
| JP | 2014-151318 A | | 8/2014 | |

OTHER PUBLICATIONS

Translation of JPS5196143A_Sekisui_NPL.pdf (Year: 1976).*
Translation of Sano (JP 2005-089978) (Year: 2005).*
Extended Search Report for EP20930921.0, dated Feb. 16, 2023, Total of 11 pages.
Invitation pursuant to Rule 62a(1) EPC issued on Oct. 5, 2022, in counterpart European Patent Application No. 20930921.0.
International Search Report for PCT/JP2020/028683, issued on Sep. 15, 2020, total p. 3.

* cited by examiner

FLOATING-OIL RECOVERY DEVICE

This is a continuation application of International Patent Application No. PCT/JP2020/028683 filed on Jul. 27, 2020 claiming priority upon Japanese Patent Application No. 2020-074276 filed on Apr. 17, 2020, of which full contents are incorporated herein by reference.

BACKGROUND OF THE INVENTION

Field of the Invention

The present invention relates to a floating-oil recovery technique to facilitate recovering the floating oil spilled out over the ocean or the like, and relates to a floating-oil recovery device suitable for recovering the floating oil deteriorating to high viscosity, in particular.

Description of the Background Art

As countermeasures against oil spill accidents, the spilt oil has forcibly been recovered or an oil treatment agent has been distributed over the water surface to decompose the oil while measures being taken to prevent the oil floating on the water surface from spreading out.

As measures of preventing the oil from spreading out, a float-type water pollution prevention boom has widely been known, and the spread of oil has been regulated by said boom extended on the water (Patent Document 1).

Further, a method of jetting high-velocity water from a ship toward the water surface in a curtain shape to prevent the spread of oil has also been proposed.

As a method of recovering the oil floating on the water surface, navigating an oil recovery vessel equipped with an oil recovery facility to recover the oil has been known.

For such an oil recovery vessel, applying a method of directly skimming the oil floating on the water surface (Patent Documents 2, 3) and applying a method of recovering the oil through the oil recovery facility mounted on said vessel have been known (Patent Documents 4, 5).

The oil recovery facility equipped with a water absorption pump or an evacuation device, an oil-water separation device, and the like has supplied a mixed fluid recovered in a state having water and oil mixed with each other to the oil-water separation device, and the oil-water separation device has separated to recover only the oil.

PRIOR ART DOCUMENTS

Patent Documents

Patent Document 1: Japanese Patent Application Laid-Open Publication No. H04-64614
Patent Document 2: Japanese Patent Application Laid-Open Publication No. S59-230887
Patent Document 3: Japanese Patent Application Laid-Open Publication No. H11-152080
Patent Document 4: Japanese Patent Application Laid-Open Publication No. H04-266588
Patent Document 5: Japanese Patent Application Laid-Open Publication No. 2005-13880

Problems to be Solved

The conventional oil spread prevention techniques had the following problems:

[1] It has taken a lot of time and labor to mount the float-type water pollution prevention boom extended on the water, and the oil has easily been adhered to the water pollution prevention boom, which has provided difficulty in maintenance.

[2] When the oil is adhered to the water pollution prevention boom, it has taken a lot of time and labor to dismount such a heavier water pollution prevention boom adhered with the oil and remove the adhered oil.

[3] In the method of preventing the spread of oil by jetting high-velocity water from the ship toward the water surface in a curtain shape, the oil has easily been caused to sneak into the water to dissipate to the surrounding water area by a force of the high-velocity water flow.

The conventional oil recovery techniques had the following problems:

[1] The oil recovery facility has been upsized and as a result, the oil recovery cost has increased.

[2] When sucking and recovering an oil-water mixed fluid having floating oil and water mixed with each other for oil recovery, due to a thin film of floating oil spread on the water surface, a recovery ratio of the floating oil in the oil-water mixed fluid has been relatively low, and therefore a recovery efficiency of the floating oil has been relatively low.

[3] Due to non-synchronization in vertical movement between the oil recovery vessel and the oil floating over the water surface by waves, a suction ratio of the floating oil from a suction port positioned deeper under the water surface has been lowered. Further, upon exposure of the suction port coming out of the sea, the negative pressure state has been interrupted by sudden release from a load, and it has been difficult for the suction port to stably suck the oil.

[4] The water separated in the oil-water separation tank has been discharged to the local sea area as it is.

It has been technically difficult to completely separate water from oil in the oil-water separation tank, and for this reason, even the oil mixed in the drainage has caused water pollution in the local sea area.

[5] Upon use of an oil recovery vessel, the oil recovery facility itself in such an oil recovery vessel has been of high resistance to the water flow, which has lowered the level of movement performance of said oil recovery vessel.

[6] There has been some case that garbage is mixed in the floating oil. The accidentally sucked-in solid garbage has been likely to cause failure of the suction pump and blockage of the pipe.

[7] After recovery of the oil, it has been necessary to disassemble the suction pump and the like to clean them, and it has taken a lot of time and labor for such cleaning of the oil recovery facility, which has provided difficulty in maintenance.

[8] It has been known that some sorts of oil such as heavy oil of class C deteriorate to high viscosity when being mixed with seawater.

Conventionally, it has been technically difficult to recover highly viscous oil such as heavy oil of class C, and it has been desired to propose a new technique enabling highly viscous oil to be recovered.

The conventional method of treating oil through the use of an oil treatment agent had the following problems:

[1] The oil treatment agent has not worked merely by being distributed over. In order to cause the oil treatment agent to perform any functions, it has been necessary for the oil treatment agent to be forcibly stirred to be mixed with the oil.

[2] Stirring the oil treatment agent and the oil such that they are mixed with each other could not be performed by human power, and it has been necessary to use a device dedicated to stirring/mixing, which has resulted in increase of the oil treatment cost.

SUMMARY OF THE INVENTION

The present invention is made in view of the above-described problems, and the objective thereof is to provide at least one of the following aspects of a floating-oil recovery device:

[1] A device is capable of efficiently recovering floating oil while regulating the spread of floating oil without making any direct contact with the floating oil.

[2] A device is capable of recovering floating oil deteriorating to high viscosity.

[3] A device is capable of suppressing deterioration of water quality in the local water area.

[4] A device is capable of performing stirring/mixing of an oil treatment agent through the use of the same device used for recovering the floating oil.

[5] A device is capable of having ease of maintenance.

[6] A device is capable of being downsized and lightweight, which enhances the level of movement performance of a ship equipped with the same device.

MEANS FOR SOLVING PROBLEMS

One aspect of the present invention provides a floating-oil recovery device comprising: a bubble-curtain generation mechanism configured to discharge air into water to generate a bubble curtain in the water so as to increase a thickness of a film of floating oil while regulating spread of the floating oil; and an ejector configured to recover an oil-water mixed fluid having the floating oil and the water mixed with each other by jetting high-velocity water toward the film of floating oil enclosed with the bubble curtain to destroy the film of floating oil.

Another aspect of the present invention may provide a floating-oil recovery device comprising: a bubble-curtain generation mechanism configured to discharge air into water to generate a bubble curtain in the water so as to increase a thickness of a film of floating oil while regulating spread of the floating oil; an ejector configured to recover an oil-water mixed fluid having the floating oil and the water mixed with each other by jetting high-velocity water toward the film of floating oil enclosed with the bubble curtain to destroy the film of floating oil; and an oil-water separation tank that oil is therein separated to be recovered from the oil-water mixed fluid recovered by the ejector.

Still another aspect of the present invention may provide a floating-oil recovery device comprising: a support frame to be attached to a portion of a ship; a bubble-curtain generation mechanism configured to discharge air from a bottom portion of the support frame into water to generate a bubble curtain in the water so as to regulate spread of floating oil; an ejector including a nozzle for jetting high-velocity water toward the film of floating oil enclosed with the bubble curtain to destroy the film of floating oil, and an intake pipe for taking in the high-velocity water jetted through the nozzle so as to generate negative-pressure suction force, thereby to recover an oil-water mixed fluid having the floating oil and the water mixed with each other into the intake pipe; and an oil-water separation tank, to be mounted on the ship, that oil is therein separated to be recovered from the oil-water mixed fluid recovered by the ejector, wherein an oil-water recovery pipe is connected between the ejector and the oil-water separation tank, and wherein a water supply pipe provided with a high-velocity water supply unit is connected between the oil-water separation tank and the nozzle so that the water separated in the oil-water separation tank is circulated to be supplied to the nozzle as the high-velocity water through the water supply pipe and the high-velocity water supply unit.

As other aspects of the present invention, the floating-oil recovery device of said still another aspect of the present invention may be provided, wherein a portion of the ejector having a float attached thereto is supported pivotably on a portion of the support frame so as to be swingable in a vertical direction in such a manner that a height of oil and water taken in by the ejector follows a change in water level.

As other aspects of the present invention, the floating-oil recovery device of said one aspect, said another aspect, or said still another aspect of the present invention may be provided, wherein the bubble-curtain generation mechanism includes: an aeration pipe arranged on a support frame to be attached to a portion of a ship; an air supply unit having an air pump and a motor mounted on the ship; and an air supply pipe connected between the aeration pipe and the air supply unit, and wherein the bubble curtain is generated by an ascending flow of a group of bubbles discharged from the aeration pipe.

As other aspects of the present invention, the floating-oil recovery device of said still another aspect of the present invention may be provided, wherein the oil-water separation tank includes: a main tank that the oil-water mixed fluid recovered by the ejector is stored therein; and a plurality of partition plates arranged in the main tank, wherein oil and water are separated with the aid of difference in specific gravity in the main tank.

As other aspects of the present invention, the floating-oil recovery device of said still another aspect of the present invention may be provided as further comprising: an auxiliary tank, mounted on the ship, that an oil treatment agent is stored therein; an oil treatment agent supply unit configured to supply the oil treatment agent stored in the auxiliary tank to the water supply pipe; and an auxiliary pipe connected between the oil treatment agent supply unit and the water supply pipe, wherein the film of floating oil and the oil treatment agent floating on a water surface are stirred to be mixed through the use of the ejector having the intake pipe arranged such that an outlet side of the intake pipe faces into the water.

Advantageous Effects of the Invention

The present invention can achieve at least one of the following advantageous effects:

[1] As a result of combining: the bubble-curtain generation mechanism having the function of preventing the spread of floating oil and increasing the thickness of the film of floating oil by the bubble curtain; and the ejector having an ejector function (Venturi effect) to recover the floating oil in the form of an oil-water mixed fluid, a recovery ratio of the floating oil in the oil-water mixed fluid can be enhanced, and therefore a recovery efficiency of the floating oil can be significantly improved.

[2] Needless to say that it can be applied to the recovery of low-viscosity floating oil, the floating oil deteriorating to high viscosity having been considered to be difficult for recovery can be recovered efficiently by jetting high-velocity water to destroy the film of floating oil.

[3] The floating oil can be recovered in a non-contact manner through the use of the ejector instead of a known suction pump while the spread of floating oil can be effectively regulated through the use of the bubble curtain instead of a known float-type water pollution prevention boom.

It is possible, therefore, to avoid failure caused by blockage, air-biting, and the like of the pipe due to garbage or the like during recovery of floating oil. After recovery of floating oil, any troublesome and time-consuming cleaning operation of the float-type water pollution prevention boom and the suction pump is not needed. As a result, such a floating-oil recovery device becomes significantly easier in maintenance than the conventional device.

[4] In a case where the water separated in the oil-water separation tank is circulated to be used as high-velocity water, an amount of the discharged oil component can be reduced and the deterioration of water quality in the local water area can be suppressed.

[5] In a case where a portion of the ejector having a float attached thereto is supported pivotably on a portion of the support frame so as to be swingable in a vertical direction, even if the water surface having the oil floating thereon changes up and down, a height of the oil and water taken in by the ejector can be automatically adjusted so as to follow a change in water level.

As a result, the floating oil can be efficiently recovered without being greatly affected by waves.

[6] For stirring and mixing the oil treatment agent with the floating oil, the same floating-oil recovery device can be applied, only by a simple operation such as replacing some pipe of said device.

[7] Since the structure of the floating-oil recovery device is simple and lightweight, it is possible to enhance the level of movement performance of the ship equipped with the same device.

DESCRIPTIONS OF EMBODIMENTS OF THE INVENTION

Hereinafter, a floating-oil recovery device in an embodiment according to the present invention will be described in detail with reference to the drawings.

[1] Outline of Floating-Oil Recovery Device

Figure 1:
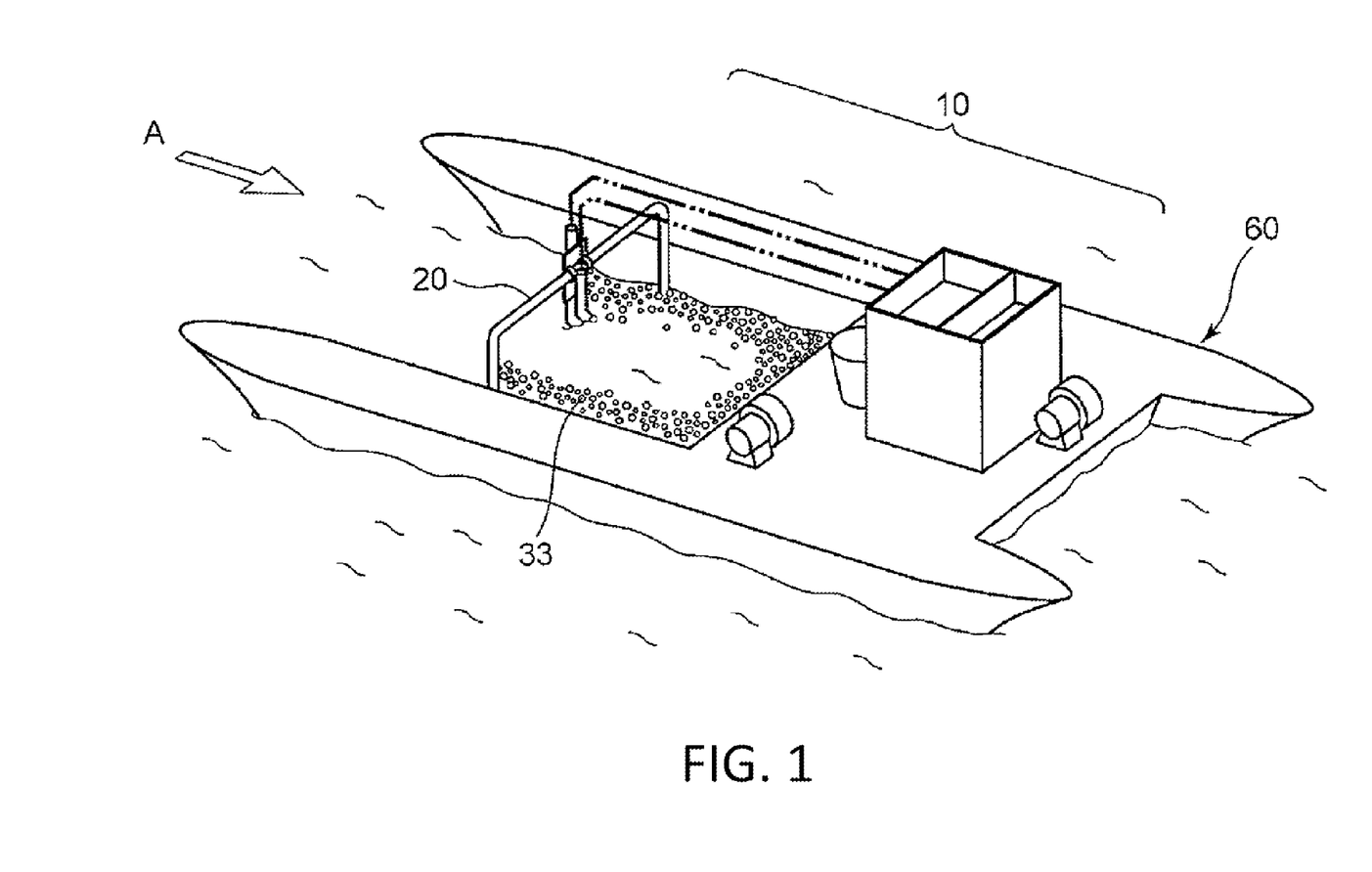
FIG. 1 is an overall explanatory view of a floating-oil recovery device in an embodiment according to the present invention applied to a ship.

Embodiments will be described with reference to FIGS. 1, 2. In this example, an embodiment applied to the floating oil spilled out over the sea surface will be described, and such an embodiment may also be applied to the floating oil spilled out over the water surface such as those of rivers and lakes.

A floating-oil recovery device 10 in an embodiment according to the present invention is a device capable of improving the efficiency of recovering floating oil while suppressing the spread of floating oil in a non-contact manner.

The recovery device 10 includes: a support frame 20 attached integrally to a portion of a ship 60; a bubble-curtain generation mechanism configured to discharge air from a bottom portion of the support frame 20 into water to generate a bubble curtain in the water so as to regulate the spread of floating oil; and an oil-water recovery mechanism configured to recover the floating oil whose spread is regulated by the bubble curtain.

In this example, an embodiment using the recovery device 10 mounted on the ship 60 such as a catamaran will be described. The ship 60 is not, however, limited to the catamaran, and may include a single-hulled vessel and towing vessel. Further, a position at which the ship 60 is attached with the recovery device 10 may be the front, side, or rear position of the ship 60.

Hereinafter, the main elements will be described in detail.

[2] Support Frame

In the descriptions of the support frame 20, an "A" side of an intake direction of floating oil is defined as a "front side," and an opposite side to the "A" side of the intake direction of floating oil is defined as a "rear side."

Figure 2:
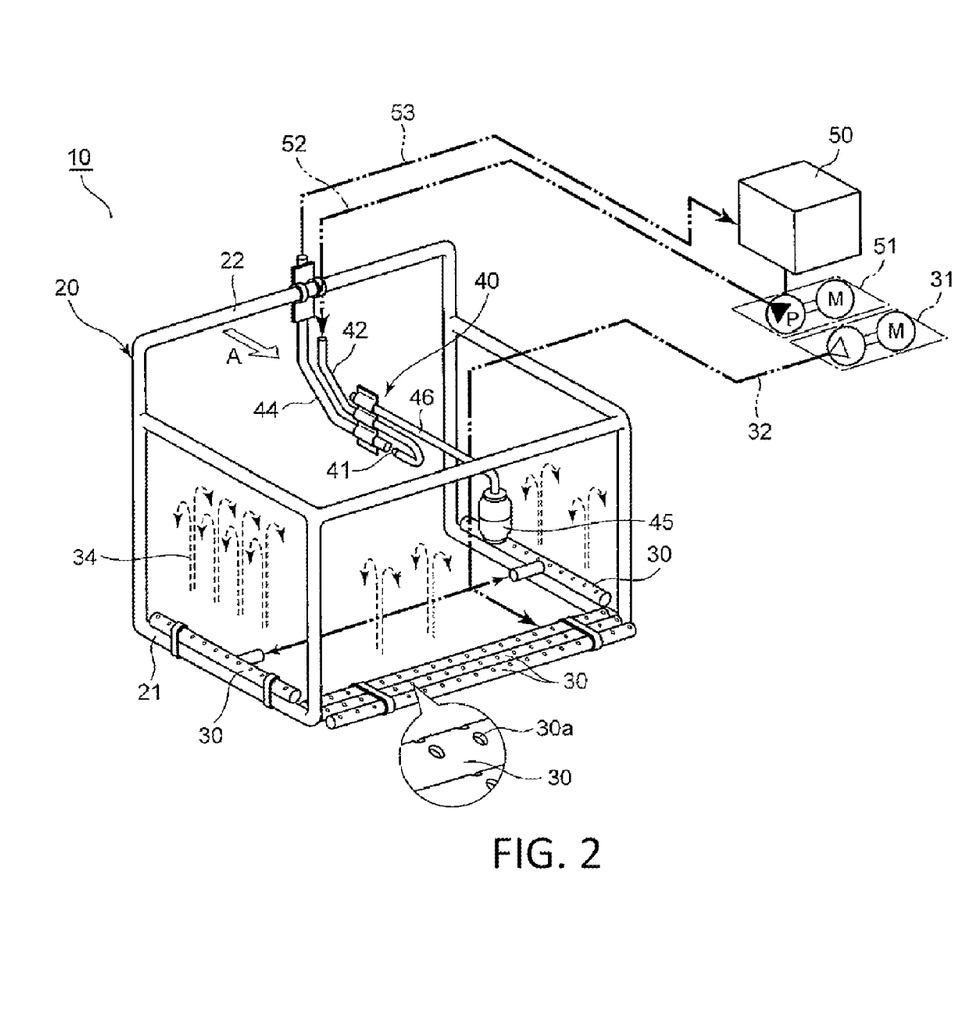
FIG. 2 is a schematic view showing a model of floating-oil recovery device according to the present invention.
Figure 3:
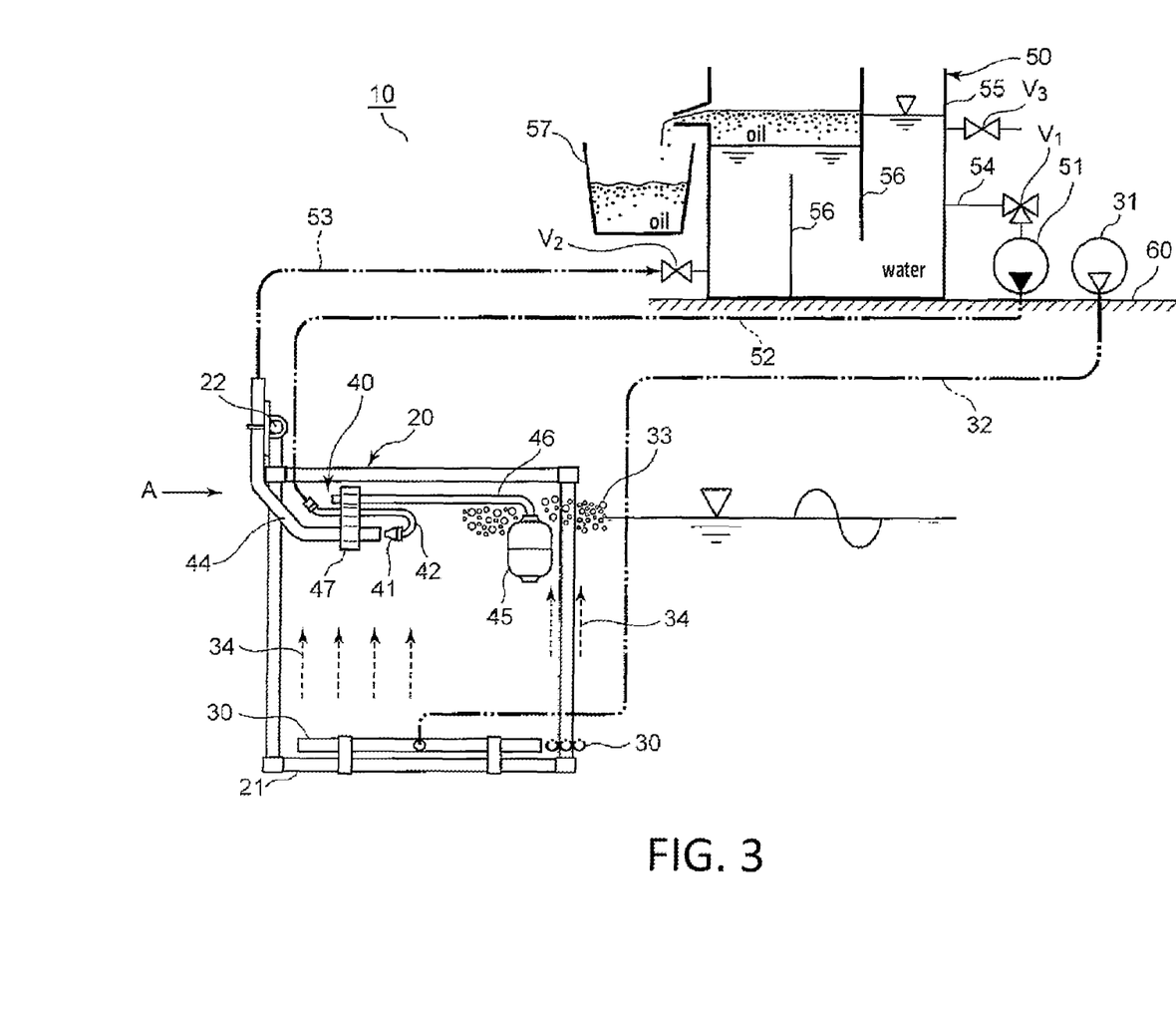
FIG. 3 is another schematic view showing the model of floating-oil recovery device according to the present invention.

With reference to FIGS. 2, 3, the support frame 20 is a rigid frame body to be arranged thereon with: an aeration pipe 30 for discharging air into water; and an ejector 40 for destroying to recover a film of floating oil through the use of a high-velocity water jet flow. The support frame 20 in a substantially rectangular parallelepiped shape is obtained as a result of assembling rigid members such as single pipes arranged vertically and horizontally.

The support frame 20 has at least: a bottom frame portion 21 to be arranged thereon with the aeration pipe 30 in a flat C-shape or in a flat U-shape; and a front-side horizontal support shaft 22 for supporting the ejector 40 pivotably on a front-side upper portion of the support frame 20.

The attachment height of the support frame 20 with respect to the ship 60 is adjustable.

[3] Bubble-Curtain Generation Mechanism

In an embodiment according to the present invention, a known oil boom is no longer used as floating-oil containment means.

In an embodiment according to the present invention, the spread of floating oil is regulated through the use of a bubble-curtain generation mechanism.

With reference to FIGS. 2, 3, the bubble-curtain generation mechanism includes: the aeration pipe 30 arranged on the bottom frame portion 21 of the support frame 20; an air supply unit 31 having an air pump and a motor mounted on the ship 60; and an air supply pipe 32 connected between the aeration pipe 30 and the air supply unit 31.

The aeration pipe 30 is a pipe or tube having both ends closed and a peripheral surface perforated with a plurality of aeration holes 30a along a longitudinal direction of the pipe or tube between both the ends.

As a result of continuously or intermittently supplying air through the air supply unit 31 and the air supply pipe 32, a flat C-shaped or flat U-shaped bubble curtain can be generated in the water immediately above the aeration pipe 30.

In this example, an embodiment having the aeration pipe 30 arranged on three sides, other than the front side, of the bottom frame portion 21 of the support frame 20 will be described. The number of aeration pipes 30 arranged on each side is appropriately selected.

The reason why the aeration pipe 30 is not arranged on the front side of the support frame 20, i.e., the "A" side of the intake direction for the floating oil, is to take in the floating oil through the front side into a region surrounded by the bubble curtain generated above along the three sides of the bottom frame portion 21 of the support frame 20. The reason why the aeration pipe 30 is arranged on the three sides of the bottom frame portion 21 of the support frame 20 is to confine the taken-in floating oil inside the region surrounded by the bubble curtain so as to prevent the floating oil from flowing outside the surrounded region.

In other words, the bubble curtain not only performs the function of preventing the spread of floating oil "O," but also performs the function of confining the floating oil inside the bubble curtain so as to increase the thickness of the film of floating oil "O" (a floating oil film thickening function).

[4] Oil-Water Recovery Mechanism

The oil-water recovery mechanism is a mechanism configured to enable the floating oil to be pipe-transported in the form of oil-water mixed fluid obtained as a result of destroying the film of floating oil through the use of a high-velocity water jet flow.

With reference to FIGS. 2, 3, the oil-water recovery mechanism includes: an ejector 40 supported by the support frame 20 in a pivotable and rotatable manner around the front-side horizontal support shaft 22 of the support frame 20; an oil-water separation tank 50 mounted on the ship 60; a high-velocity water supply unit 51 having a water supply pump and a motor; a water supply pipe 52 connected between the ejector 40 and the high-velocity water supply unit 51; and an oil-water recovery pipe 53 connected between the ejector 40 and the oil-water separation tank 50.

[4.1] Ejector

The ejector 40 shown in FIG. 6 will be described. The ejector 40 includes: a nozzle 41 for jetting high-velocity water; an intake pipe 44 positioned at a jetting side of the nozzle 41; and a float 45 for adjusting automatically a height of oil and water taken in by the ejector 40 such that the height follows a change in local water level.

Figure 6:
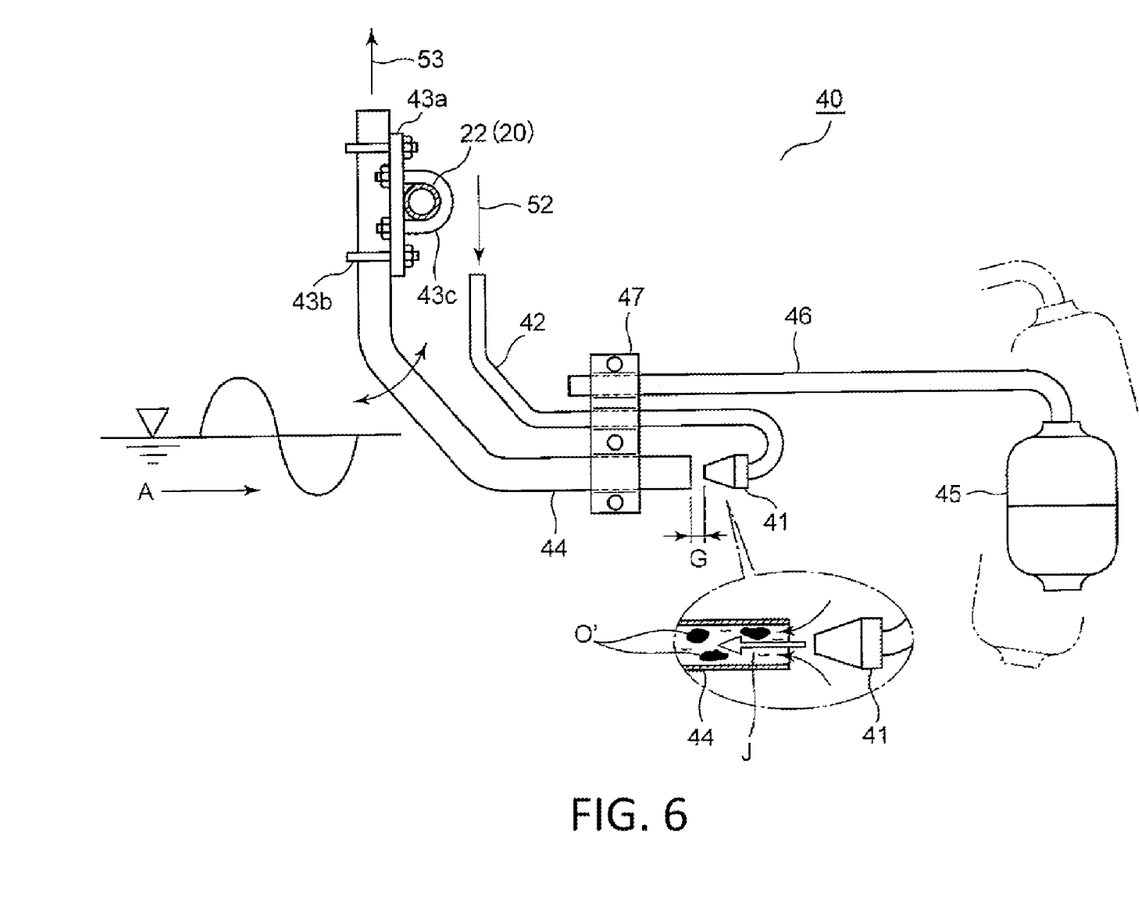
FIG. 6 is a side view of the ejector.

The ejector 40 is not limited to an embodiment shown in FIG. 6, and any devices capable of sucking a mixed fluid of floating oil and water by an ejector function (Venturi effect) may be applied.

In this example, an embodiment having one ejector 40 deployed for one support frame 20 will be described; and alternatively, a plurality of ejectors 40 may be deployed for one support frame 20.

[4.1.1] Nozzle

A water supply pipe 42 bent in a J-shape has an inlet side connected to an outlet tip of the water supply pipe 52, and the nozzle 41 is provided at an outlet tip of the water supply pipe 42. High-velocity water can be continuously jetted through the nozzle 41 toward an inlet port of the intake pipe 44.

[4.1.2] Intake Pipe

The intake pipe 44 is provided at an inlet tip of the oil-water recovery pipe 53.

High-velocity water jetted from the nozzle 41 can be taken in, by the intake pipe 44, through the opening (inlet port) at the end of the intake pipe 44.

As a result of the occurrence of the ejector function (Venturi effect) induced by jetting high-velocity water into the intake pipe 44, the mixed fluid of floating oil and water located around a region of the opening (inlet port) at the end of the intake pipe 44 can be sucked into the intake pipe 44.

[4.1.3] Coupling Plate

A coupling plate 47 is a member for coupling integrally the water supply pipe 42, the intake pipe 44, and a coupling lever 46 of the float 45 arranged in parallel with each other.

By such a member, the nozzle 41 and the opening of the intake pipe 44 are mutually arranged at a predetermined position.

[4.1.4] Gap Between Nozzle and Intake Pipe

In this example, an open-type ejector, having the intake pipe 44 arranged so as to have a predetermined gap G from a jetting side of the nozzle 41 such that the oil and water around the jet flow are taken into the intake pipe 44 through the predetermined gap G, will be described. The ejector may be a closed-type ejector capable of jetting high-velocity water through the nozzle 41 inserted structurally into an end of the intake pipe 44 such that the oil and water around the jet flow in the vicinity of the end are taken into the intake pipe 44.

In the open-type ejector, oil can be taken in optimally by adjusting the gap G in accordance with the viscosity or the like of the floating oil.

[4.1.5] Pivotal Support Structure of Ejector

Figure 5:
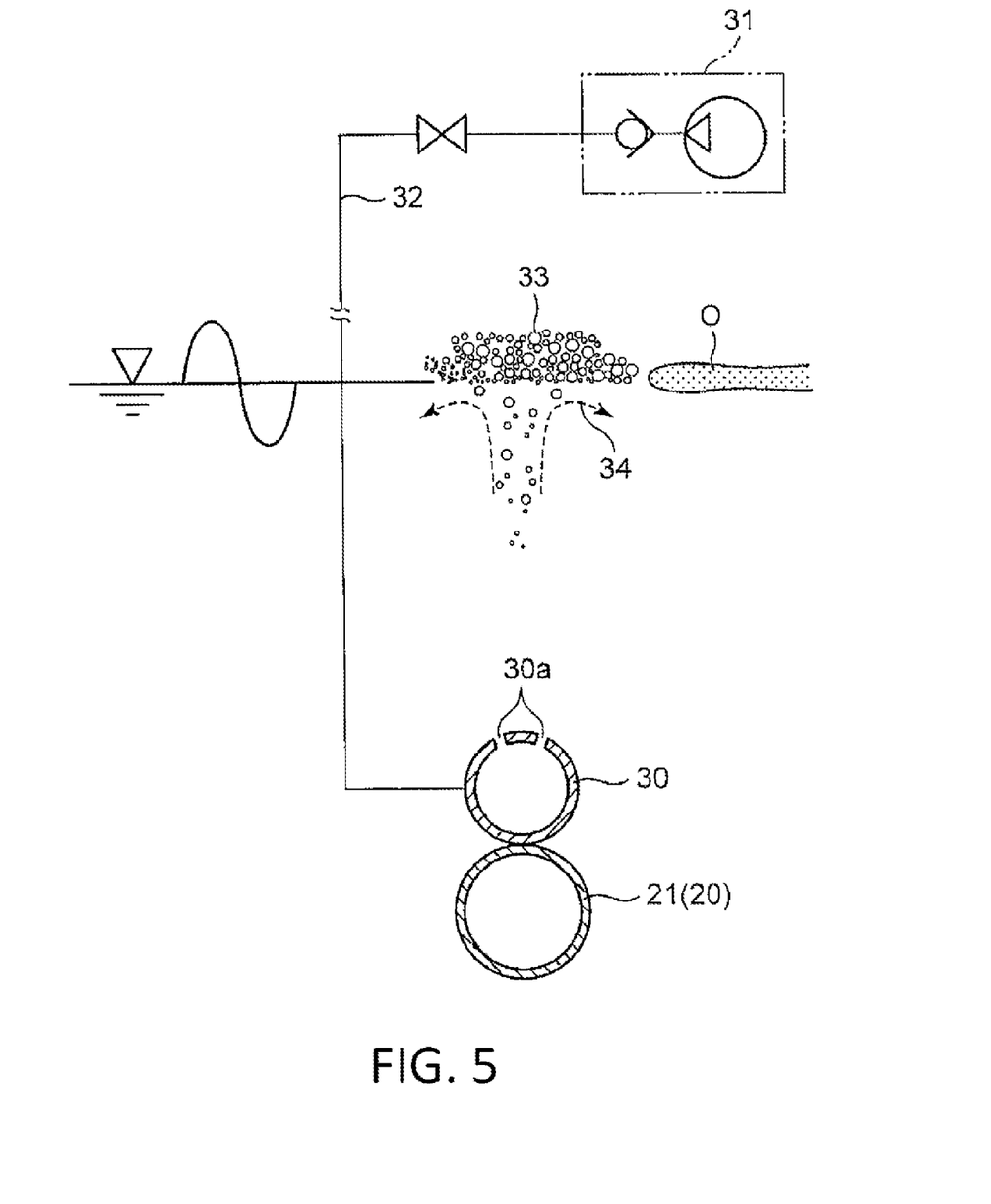
FIG. 5 is a cross-sectional view along V-V in FIG. 4.

As shown in FIGS. 2, 5, the ejector 40 is supported by the support frame 20 so as to be pivotable as well as movable up and down with respect to the front-side horizontal support shaft 22 of the support frame 20.

In this example, an embodiment, having a pivot plate 43a interposed between the front-side horizontal support shaft 22 and the intake pipe 44, and a plurality of U-bolts 43c and U-bolts 43b fixed to the pivot plate 43a for retaining the front-side horizontal support shaft 22 and the intake pipe 44, respectively, so as to support the ejector 40 pivotably, is shown. A known pivotal support structure may be applied.

[4.1.6] Float

The ejector 40 is provided with the float 45, and as a result, the height of oil and water taken in by the ejector 40 can be automatically adjusted so as to follow a change in water level.

In this example, an embodiment attached with the float 45 through the coupling lever 46 is shown. Alternatively, the float 45 may be attached to a portion of the water supply pipe 42 or the intake pipe 44, which is associated with the omission of the coupling lever 46.

[4.2] Oil-Water Separation Tank

With reference to FIG. 3, the oil-water separation tank 50 has a mechanism configured to separate the mixed fluid of floating oil and water recovered by the ejector 40 into the floating oil and the water.

In this example, a method of separating floating oil and water with the aid of difference in specific gravity will be described; and alternatively, a known separation method such as a cyclone method can be applied to the oil-water separation tank 50.

An embodiment in this example will be described. The oil-water separation tank 50 has a main tank 55 and a plurality of partition plates 56 arranged vertically at intervals in the main tank 55.

The terminal end of the oil-water recovery pipe 53 is connected to the vicinity of the bottom portion of the main tank 55 so that the sucked oil-water mixed fluid is discharged into the main tank 55.

The suction pipe 54 is connected between the vicinity of the bottom portion of the main tank 55 and a suction side of the high-velocity water supply unit 51 so that the water separated in the main tank 55 can be circulated to be used through the suction pipe 54, the water supply pipe 52, the water supply pipe 42, and the nozzle 41.

An oil recovery tank 57 is provided next to the main tank 55 so as to allow the main tank 55 to overflow with the separated oil and recover the separated oil in the oil recovery tank 57.

In FIG. 3, $V_1$ denotes a switching valve interposed between the suction pipe 54 and the water supply pipe 52, $V_2$ denotes an on-off valve provided in the oil-water recovery pipe 53, and $V_3$ denotes a drain valve provided in a portion of the oil-water separation tank 50.

Floating-Oil Recovery Method

A method of recovering floating oil through the use of the floating-oil recovery device 10 will be described.

In an embodiment according to the present invention, a taken-in floating-oil spread prevention step by the bubble-curtain generation mechanism, an oil-water recovery step by the ejector 40, and an oil-water separation step by the oil-water separation tank 50 are proceeded with in parallel.

[1] Floating-Oil Spread Prevention Step

In an embodiment according to the present invention, the bubble-curtain generation mechanism is used as means for preventing the spread of floating oil without using a known oil boom.

A method for containment of the floating oil "O" will be described with reference to FIGS. 2 to 5.

The air supply unit 31 shown in FIGS. 2, 3 is operated to supply gas such as air through the air supply pipe 32 toward the aeration pipe 30 arranged in a flat C-shape or in a flat U-shape.

Figure 4:
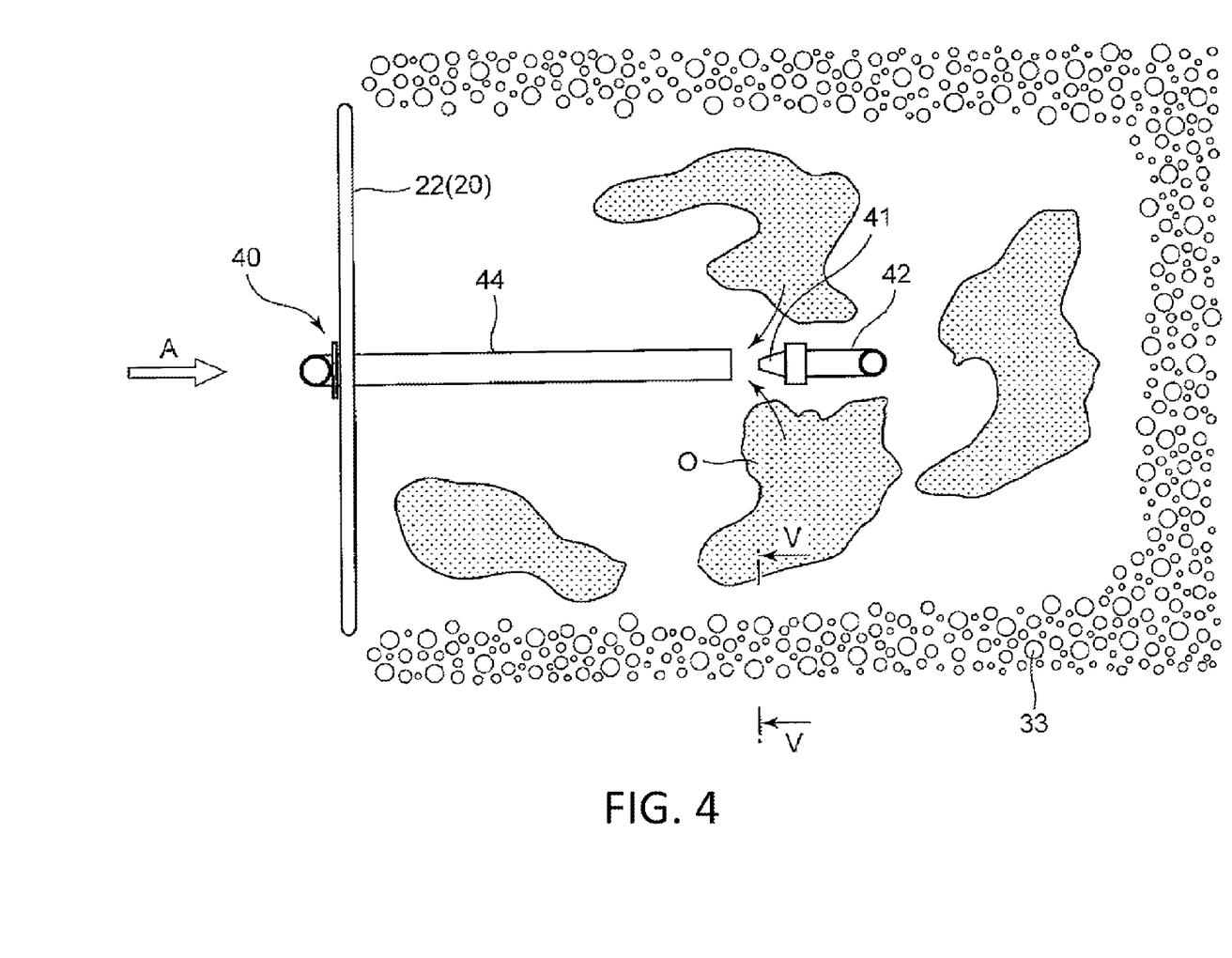
FIG. 4 is a plan view of an ejector as seen from above the sea surface.

When air or the like is supplied to the aeration pipe 30, as shown in FIGS. 4, 5, a group of bubbles 33 is discharged into the water through the aeration holes 30a of the aeration pipe 30, and the surrounding water entrained with the floating group of bubbles 33 forms an ascending water flow 34 in a curtain shape.

A bubble curtain is generated by the ascending water flow 34 isolated from the surrounding sea area and the group of bubbles 33 floating on the water surface.

The floating oil "O" is taken in inside an area surrounded by the bubble curtain through an open space of the bubble curtain.

The bubble curtain is generated in a curtain shape continuous over a below-water section from a depth not less than a film-thickness of floating oil "O" to the water surface as well as an above-water section as an upper part of the bubble curtain having the group of bubbles 33 rising from the water surface.

Therefore, as the bubble curtain regulates the spread of the taken-in floating oil "O," a film-thickness of the floating oil "O" confined inside the area surrounded by the bubble curtain increases.

[2] Oil-Water Recovery Step

A method of recovering the floating oil "O" inside an area surrounded by the bubble curtain will be described with reference to FIGS. 3, 4, 6.

[2.1] Recovery of Oil and Water

The high-velocity water supply unit 51 shown in FIG. 3 is operated to supply continuously water through the water supply pipe 52 toward the nozzle 41 at the outlet tip of the water supply pipe 42.

FIG. 6 shows a state where high-velocity water "J" is jetted continuously from the nozzle 41 toward the inlet port of the intake pipe 44. When the high-velocity water "J" is jetted continuously from the nozzle 41 toward the inlet port of the intake pipe 44, the mixed fluid of the local water and the floating oil "O" located around the nozzle 41 is sucked by an ejector function (Venturi effect).

The sucked mixed fluid of the floating oil "O" and the local water is transported to the oil-water separation tank 50 through the oil-water recovery pipe 53 shown in FIG. 3.

In particular, the high-velocity water "J" destroys the lump of the floating oil "O" inside the intake pipe 44, and as a result, the mixed fluid becomes a kneaded mixture having destroyed product "O" of the floating oil "O" kneaded with water.

The "water" here includes not only the high-velocity water "J" jetted from the nozzle 41 but also the local water such as the surrounding seawater taken in by the high-velocity water "J."

Assuming that there is no bubble curtain, the floating oil "O" spread widely on the sea surface would be sucked, and for this reason, an amount of the local water taken in would increase significantly so that a recovery ratio of the floating oil "O" would decrease.

On the other hand, by the bubble-curtain generation mechanism combined with the ejector 40, the film of floating oil enhanced in thickness by the bubble curtain gathers at the inlet portion of the ejector 40 so that the oil recovery ratio increases and the recovery efficiency of the floating oil "O" is significantly improved.

Further, the floating oil is recovered along with water which reduces the recovery ratio thereof for the local water, and as a result, a blockage accident in the intake pipe 44 and the oil-water recovery pipe 53 is unlikely to occur.

Still further, the suction pump is not used as means for recovering the floating oil "O," and therefore, even if foreign matter such as garbage is mixed in the floating oil "O," there is no concern of suck-in foreign matter's causing failure of the suction pump.

[2.2] Case of Highly Viscous Floating Oil

If the floating oil "O" is heavy oil of class C, it deteriorates to high viscosity when being mixed with seawater.

It has been difficult to recover the floating oil "O" deteriorating to high viscosity by the conventional vacuum suction.

On the other hand, the ejector 40 can recover the floating oil "O" while jetting high-velocity water "J" to destroy the film of floating oil "O," and as a result, the floating oil "O" can be efficiently recovered by the ejector 40 even if the film of floating oil "O" deteriorates to high viscosity.

[2.3] Automatic Adjustment of Oil and Water Taking-In Height

As shown in FIG. 6, the ejector 40 is provided with a float 45, and the base end of the ejector 40 is supported pivotably by the support frame 40 so that the ejector 40 can swing in a vertical direction around the front-side horizontal support shaft 22 of the support frame 40.

As a result, even if the water surface of the floating oil "O" changes up and down, the height of the oil and water taken in by the ejector 40 is automatically adjusted so as to follow a change in water level. As a consequence, the floating oil "O" can be recovered efficiently without being affected by waves.

Even if an ejector portion of the ejector 40 floating from the sea surface is exposed to the atmosphere due to the influence of waves, it is possible for the ejector 40 to avoid failure of an unrecoverable state caused by air-biting because the ejector 40 is not a device of negative-pressure suction type.

[3] Oil-Water Separation Step

With reference to FIG. 3, the mixed fluid transported to the oil-water separation tank 50 through the oil-water recovery pipe 53 is separated into oil and water with the aid of difference in specific gravity.

The main tank 55 overflows with the oil separated therein, and the separated oil overflowing the main tank 55 is recovered in the oil recovery tank 57.

In general, complete separation of water and oil in the storage tank body 55 is technically difficult contrary to expectations.

For this reason, if the water separated in the main tank 55 is discharged to the local sea area as it is, for example, the oil component mixed in the separated water is discharged, which may cause water pollution in the local sea area.

By circulating to use the water separated in the main tank 55 as high-velocity water to be jetted from the nozzle 41 instead of discharging it to the local sea area as it is, an amount of the discharged oil component can be reduced and the deterioration of water quality in the local sea area can be suppressed.

Further, by circulating to use the water separated in the main tank 55 for recovery of the floating oil "O," the recovered oil can be concentrated in the main tank 55.

[4] Cleaning Step

The bubble-curtain generation mechanism formed in the water does not make any direct contact with the floating oil "O," and as a result, it is not necessary to clean the aeration pipe 30 and the like.

The ejector 40 having finished recovering the floating oil "O" can be cleaned sufficiently by cleaning simply a pipeline thereof having the intake pipe 44 and oil-water recovery pipe 53 so that the maintenance thereof is easy.

The following two methods can be applied for cleaning the intake pipe 44 and oil-water recovery pipe 53:

One is a method (backwashing method) by which a terminal end of the oil-water recovery pipe 53 is detached, and cleaning water is flushed through the oil-water recovery pipe 53 back from the terminal end.

The other is a method by which the floating-oil recovery device 10 is operated, in the sea area where the floating oil "O" is not present, with the terminal end of the oil-water recovery pipe 53 being connected to the oil-water separation tank 50 so as to clean the intake pipe 44 and the oil-water recovery pipe 53.

Other Embodiments

Hereinafter, other embodiments will be described. In the following descriptions, the same portions as those of the above-described embodiments are added with the same reference numerals, and the detailed descriptions thereof will be omitted.

1. Configuration

[1] Treatment of Floating Oil Using Oil Treatment Agent

Figure 7:
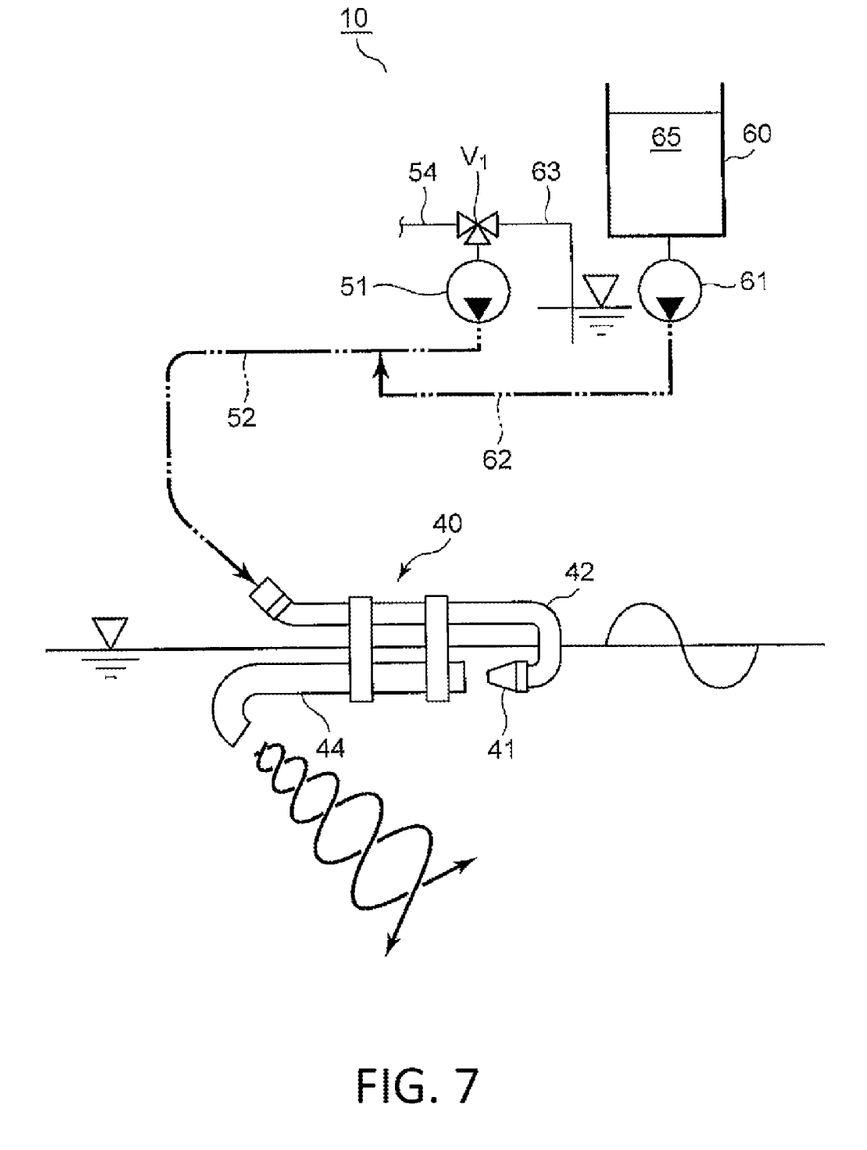
FIG. 7 is a schematic view showing another model of floating-oil recovery device using an oil treatment agent.

As described above, the floating-oil recovery device 10 can not only recover the floating oil without making any direct contact with the floating oil but also mix an oil treatment agent 65 into the floating oil on the sea surface by replacing some pipe of the device 10 to decompose the floating oil.

[2] Ejector

FIG. 7 shows the nozzle 41 and the intake pipe 44 provided at the outlet tip of the water supply pipe 42; however, the ejector 40 may include the nozzle 41, the intake pipe 44, and the float 45 as in the above-described embodiments.

[2.1] Removal of Oil-Water Recovery Pipe

In this example, without the oil-water recovery pipe 53 as a result of detachment thereof from an outlet side of the intake pipe 44, the mixed fluid containing the oil treatment agent 65 generated in such a detached intake pipe 44 is discharged to the floating oil.

[2.2] Direction of Discharge Side of Intake Pipe

The detached intake pipe 44 is positioned so that its discharge side (outlet side) faces into the sea.

The discharge side of the intake pipe 44 may be bent in a U-shape, or may be straight without being any bent.

In short, it is sufficient that the mixed fluid containing the oil treatment agent 65 can be discharged toward the sea surface through the intake pipe 44.

[3] Additional Facility

This will be described with reference to FIG. 7. In addition to the configuration described above, the floating-oil recovery device 10 includes an auxiliary tank 60 storing the oil treatment agent 65, an oil treatment agent supply unit 61 having a supply pump and a motor, and an auxiliary pipe 62 connected between the auxiliary tank 60 and the water supply pipe 52 on an outlet side of the high-velocity water supply unit 51.

In an embodiment according to the present invention, the oil treatment agent 65 is supplied to the nozzle 41 by utilizing the water supply pipe 52 and the auxiliary pipe 62.

[3.1] Oil Treatment Agent

The oil treatment agent 65 is a treatment agent in a liquid or powder form capable of decomposing oil by an oxidizing action or a microbial digestive action, and known surfactants and solvents having low toxicity to secondary contamination and marine organisms can be used.

[3.2] Oil Treatment Agent Supply System

The tip of the auxiliary pipe 62 connected to the discharge side of the oil treatment agent supply unit 61 joins a portion of the water supply pipe 52 so that the oil treatment agent 65 can be supplied to the water supply pipe 52 through the oil treatment agent supply unit 61 and the auxiliary pipe 62.

[3.3] Water Intake Source for Water Supply Pipe

The water intake source of the water supply pipe 52 may be the oil-water separation tank 50 shown in FIG. 3, and water may be taken in from other than the oil-water separation tank 50.

The water intake source of the water supply pipe 52 shown in FIG. 7 will be described. A water intake pipe 63 may be connected to a portion of the three-way switching valve $V_1$ provided on the suction side of the high-velocity water supply unit 51, and water may be transported to the water supply pipe 52 through the water intake pipe 63 pulled into the sea.

2. Floating-Oil Treatment Method

A treatment method using the oil treatment agent in this example will be described.

[1] Supply of Oil Treatment Agent

The high-velocity water supply unit 51 and the oil treatment agent supply unit 61 are operated to supply continuously water mixed with the oil treatment agent 65 to the water supply pipe 42.

[2] Stirring and Mixing of Oil Treatment Agent and Oil

When high-velocity water mixed with the oil treatment agent 65 is jetted from the nozzle 41 toward the inlet port of the intake pipe 44, the floating oil located around the nozzle 41, the high-velocity water mixed with the oil treatment agent 65, and the sucked local water are mixed in the intake pipe 44 and are discharged into the sea by the Venturi effect.

The mixed fluid containing the oil treatment agent 65 discharged into the sea is discharged in a spiral form through the intake pipe 44 so that stirring and mixing of the oil treatment agent 65 and the lump layer of the floating oil on the sea surface proceeds.

3. Effects of this Example

In this example, the oil treatment agent 65 can be mixed with the floating oil on the sea surface to perform the decomposition treatment by a simple operation of replacing some pipe of the floating-oil recovery device 10.

In general, when an oil treatment agent is used, the treatment effect is low if the oil treatment agent is sprayed only, and it is important to stir and mix the oil treatment agent with the oil.

Since the floating oil has an appropriate viscosity, the oil treatment agent needs to be mixed with the floating oil using a mechanical stirring force.

In an embodiment according to the present invention, the oil treatment agent and the floating oil can be efficiently stirred and mixed by utilizing the existing ejector so that it is not necessary to arrange any additional stirring and mixing unit dedicated for mechanically mixing the oil treatment agent and the floating oil.

REFERENCE NUMERALS

O Floating oil
A Floating-oil intake direction
$V_1$ Switching valve
$V_2$ On-off valve
$V_3$ Drain valve
10 Floating-oil recovery device
20 Support frame
21 Bottom frame portion of support frame
22 Front-side horizontal support shaft of support frame
30 Aeration pipe
30a Aeration hole
31 Air supply unit
32 Air supply pipe
33 Group of bubbles
34 Ascending water flow
40 Ejector
41 Nozzle
42 Water supply pipe
44 Intake pipe
45 Float
46 Coupling lever
47 Coupling plate
50 Oil-water separation tank
51 High-velocity water supply unit
52 Water supply pipe
53 Oil-water recovery pipe
54 Suction pipe
55 Main tank
56 Partition plate
57 Oil recovery tank
60 Ship

What is claimed is:

1. A floating-oil recovery device comprising:
a bubble-curtain generation mechanism configured to discharge air into water to generate a bubble curtain in the water so as to increase a thickness of a film of floating oil while regulating spread of the floating oil, the bubble-curtain generation mechanism comprises an aeration pipe;
an ejector configured to recover an oil-water mixed fluid having the floating oil and the water mixed with each other by jetting high-velocity water toward the film of floating oil enclosed with the bubble curtain to destroy the film of floating oil, wherein the ejector comprises a nozzle for jetting the high-velocity water and an intake pipe for taking in the high-velocity water jetted through the nozzle, with the nozzle and the intake pipe separated in line via a gap adjusted in accordance with viscosity of the floating oil, so as to generate negative-pressure suction force from around the gap, to recover the oil-water mixed fluid corresponding to an increase thickness within the bubble curtain into the intake pipe;
a float coupled to the ejector;
a support frame configured to be attached to a portion of a ship; and
wherein the aeration pipe is arranged on both sides of a bottom portion of the support frame and arranged on a rear side of the bottom portion of the support frame;
wherein the nozzle and the intake pipe are arranged substantially in a line along the horizontal axis;
wherein the ejector is supported in a pivotable and rotatable manner at a front side of the support frame;
wherein the float is arranged at a rear side of the ejector; and
wherein the bubble-curtain generation mechanism is configured to generate the bubble curtain by an ascending flow of a group of bubbles discharged from the aeration pipe arranged on the both sides of the bottom portion of the support frame and on the rear side of the bottom portion of the support frame.

2. The floating-oil recovery device according to claim 1, further comprising:
an oil-water separation tank wherein oil is separated from the oil-water mixed fluid recovered by the ejector.

3. The floating-oil recovery device according to claim 2, wherein the oil-water separation tank is to be mounted on the ship,
wherein an oil-water recovery pipe is connected between the ejector and the oil-water separation tank, and
wherein a water supply pipe provided with a high-velocity water supply unit is connected between the oil-water separation tank and the nozzle so that the water separated in the oil-water separation tank is circulated to be supplied to the nozzle as the high-velocity water through the water supply pipe and the high-velocity water supply unit.

4. The floating-oil recovery device according to claim 3, wherein a portion of the ejector having the float attached thereto is supported pivotably on a portion of the support frame so as to be swingable in a vertical direction in such a manner that a height of oil and water taken in by the ejector follows a change in water level.

5. The floating-oil recovery device according to claim 1, wherein the bubble-curtain generation mechanism includes: the aeration pipe; an air supply unit having an air pump and a motor mounted on the ship; and an air supply pipe connected between the aeration pipe and the air supply unit, and wherein the bubble curtain is generated by an ascending flow of a group of bubbles discharged from the aeration pipe.

6. The floating-oil recovery device according to claim 2, wherein the oil-water separation tank includes: a main tank that the oil-water mixed fluid recovered by the ejector is stored therein; and a plurality of partition plates arranged in the main tank, wherein oil and water are separated with the aid of difference in specific gravity in the main tank.

7. The floating-oil recovery device according to claim 3, further comprising: an auxiliary tank, mounted on the ship, that an oil treatment agent is stored therein; an oil treatment agent supply unit configured to supply the oil treatment agent stored in the auxiliary tank to the water supply pipe;

and an auxiliary pipe connected between the oil treatment agent supply unit and the water supply pipe, wherein the film of floating oil and the oil treatment agent floating on a water surface are stirred to be mixed through the use of the ejector having the intake pipe arranged such that an outlet side of the intake pipe faces into the water.

\* \* \* \* \*